Dec. 12, 1950   G. ALFANO   2,533,341
REEL FOR ELECTRICAL CABLES
Filed Dec. 5, 1946

INVENTOR.
GUSTAVE ALFANO
BY
AGENT

Patented Dec. 12, 1950

2,533,341

UNITED STATES PATENT OFFICE 2,533,341

REEL FOR ELECTRICAL CABLES

Gustave Alfano, Long Island City, N. Y.

Application December 5, 1946, Serial No. 714,257

1 Claim. (Cl. 242—96)

The present invention relates to reels for electrical cables adapted to take up the slack in electrical cables particularly for wires used in lighting utensils, telephones, or the like.

Electric cord reels are known in combination with an outlet plug, which is made in the form of conventional reels, however, integrally combined with a plug. These known reels provided means for winding a cable, yet nothing would prevent the involuntary unwinding of the cable and, in addition, due to the plug the capacity of receiving a cable was rather limited.

It is the main object of the present invention to provide a reel for electrical cables which is capable of receiving a comparatively great length of an electrical cable.

It is another object of the present invention to provide a reel for electrical cables which does not permit an involuntary unwinding of the cable from the reel.

It is still another object of the present invention to provide locking means for the cable wound on the reel.

With these and other objects in view the present invention will be clearly understood and become apparent from the following specification in connection with the accompanying drawing in which.

Figure 1:
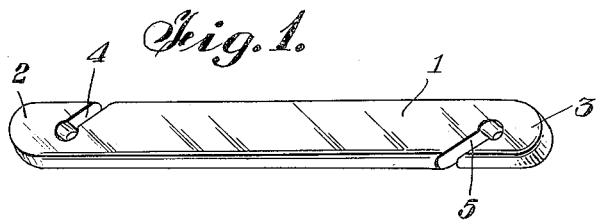
Figure 1 is a perspective view of the reel.

Referring now to the drawing, the reel comprises a longitudinal body 1 of preferably flat shape and rounded ends 2 and 3. Slots 4 and 5 are provided at the ends 2 and 3, respectively, which slots 4 and 5 extend preferably at about an angle of 45° from the edge in the direction towards the ends 2 and 3, respectively, to approximately the longitudinal axis of the body 1. Thus the two slots 4 and 5 are substantially in parallel arrangement with their open ends at the opposite longitudinal edges of the body 1.

The width of the slots 4 and 5 is slightly smaller than the outer diameter of the cable or wire to be received by the slots. Since the cables or wires for electrical utensils or telephones are of conventional diameter the reel can be used for any utensils having conventional wire. The reel can of course be made of different size and cross section and may be equipped with slots of any predetermined width in accommodation to the outer diameter of the wire which is to be wound on the reel.

Figure 2:
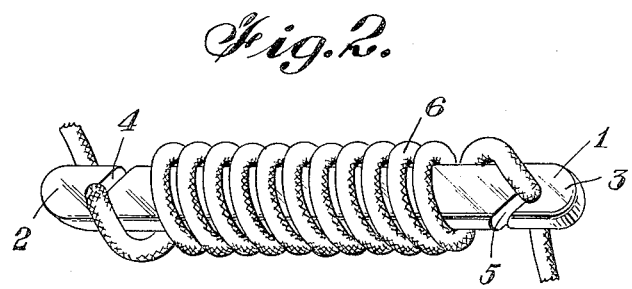
Fig. 2 is a perspective view of the reel with the electrical cable wound thereon.
Figure 3:
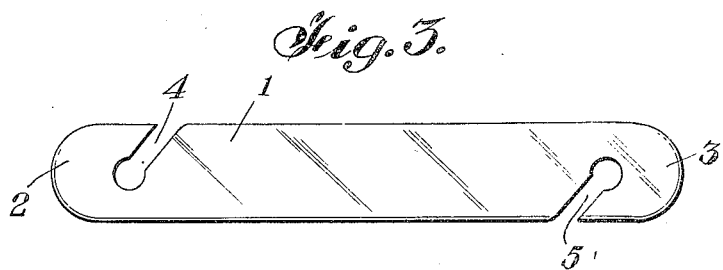
Fig. 3 is a plan view of the reel.
Figure 4:
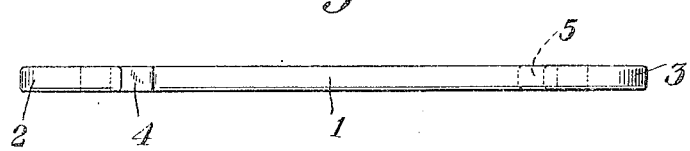
Fig. 4 is an elevational view of the reel shown in Fig. 3.

As clearly shown in Fig. 2 the slack of the cable or wire 6, which would extend on the floor or form a hanging loop and thereby provide a source for accidents, is at a predetermined point inserted in the slot 4, the adjacent portion of the cable 6 wound over the main portion of the body 1, each winding extending about perpendicularly to the longitudinal axis of the body 1 and upon winding a predetermined length of the cable 6, the end of the latter is inserted into the second slot 5. The cable 6 is locked in the slots 4 and 5, respectively, and thereby retains its wound portion on the reel.

While I have described one embodiment of the present invention, it is clearly understood that this embodiment is given by example only, and not limiting the scope of the invention, which is determined by the appended claims.

I claim:

A reel for an electrical cable of a predetermined diameter comprising a longitudinal flat shaped body, a slot adjacent each end of the body, the slots being disposed parallel from opposite longitudinal edges of the body in an angle of about 45° in a direction towards the ends of the body and of a width slightly narrower than the predetermined diameter of the cable to terminate at about the longitudinal axis of the body in a substantially circular opening equivalent to the predetermined diameter of the cable and receiving and retaining portions of the cable in the circular openings of said body, the portion of the body between the two slots receiving windings of the portion of the cable lying between the two retained portions.

GUSTAVE ALFANO.

REFERENCES CITED

The following references are of record in the file of this patent:

UNITED STATES PATENTS

| Number | Name | Date |
| --- | --- | --- |
| 1,275,735 | Phillips | Aug. 13, 1918 |
| 1,330,093 | Robertson | Feb. 10, 1920 |
| 1,634,436 | Polson | July 5, 1927 |

FOREIGN PATENTS

| Number | Country | Date |
| --- | --- | --- |
| 12,391 | Great Britain | May 21, 1910 |
| 448,425 | Great Britain | June 2, 1936 |